United States Patent
Warkentin et al.

(10) Patent No.: US 11,093,259 B2
(45) Date of Patent: *Aug. 17, 2021

(54) REMOTE PROVISIONING OF HOSTS IN PUBLIC CLOUDS

(71) Applicant: VMware, Inc., Palo Alto, CA (US)

(72) Inventors: Andrei Warkentin, Cambridge, MA (US); Harvey Tuch, Cambridge, MA (US); William Lam, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 16/149,971

(22) Filed: Oct. 2, 2018

(65) Prior Publication Data

US 2019/0179646 A1 Jun. 13, 2019

Related U.S. Application Data

(63) Continuation of application No. 15/282,893, filed on Sep. 30, 2016, now Pat. No. 10,114,659.

(51) Int. Cl.
*G06F 9/44* (2018.01)
*G06F 9/4401* (2018.01)
*G06F 9/455* (2018.01)
*G06F 8/61* (2018.01)

(52) U.S. Cl.
CPC .............. *G06F 9/4416* (2013.01); *G06F 8/63* (2013.01); *G06F 9/45558* (2013.01); *G06F 2009/4557* (2013.01); *G06F 2009/45595* (2013.01)

(58) Field of Classification Search
CPC ....... G06F 9/45558; G06F 8/63; G06F 9/4416
See application file for complete search history.

(56) References Cited

U.S. PATENT DOCUMENTS

| | | |
|---|---|---|
| 2012/0084769 A1 | 4/2012 | Adi |
| 2012/0151477 A1 | 6/2012 | Sinha |
| 2016/0373301 A1 | 12/2016 | Sakata |

OTHER PUBLICATIONS

Unknown, "Auto Deploy ESXi Installation", VMware, Inc., captured May 25, 2016, http://pubs.vmware.com/vsphere-60/advanced/print.jsp?topic=/com.vmw, 1 page.
Wood, Julian, "What's New in vSphere 6.0: Multi-CPU Fault Tolerance", WoodITWork.com, Aug. 26, 2014, 8 pages.
Stack, Timothy, "VMware Auto Deploy Administrator's Guide", VMware, Inc., captured May 25, 2016, 32 pages.
Unknown, "vSphere and vSphere with Operations Management", VMware, Inc., 2016, 15 pages.

*Primary Examiner* — Albert Wang

(57) ABSTRACT

Examples provide for automatically provisioning hosts in a cloud environment. A cloud daemon generates a cloud host-state configuration, for a given cloud instance of a host, stored on a cloud metadata service prior to first boot of the given cloud instance of the host. A first boot of a plurality of cloud instances of hosts is performed using a stateless, master boot image lacking host-specific configuration data. On completion of the first boot of a given cloud instance of a host, the cloud host-state configuration is installed on the master boot image to generate a self-configured boot image including host-specific configuration data for the given cloud instance of the host. A second boot is performed on the given cloud instance of the host by executing the self-configured boot image to automatically provision the given cloud instance of the host in the cloud environment.

20 Claims, 13 Drawing Sheets

REMOTE PROVISIONING OF HOSTS IN PUBLIC CLOUDS

CROSS REFERENCE TO RELATED APPLICATION

This application is a continuation of U.S. patent application Ser. No. 15/282,893, filed Sep. 30, 2016, entitled "Remote Provisioning of Hosts in Public Clouds", the entirety of which is incorporated herein by reference.

BACKGROUND OF THE INVENTION

Deploying hosts of virtual computing instances, such as virtual machines (VMs), inside a public infrastructure frequently poses challenges. Some existing technologies for rapidly provisioning hosts rely on network pre-boot execution environment (PXE) booting support and/or control over the on-premises network and additional on-site infrastructure. However, public cloud infrastructures typically do not support network booting (netboot) options. Without network booting support, PXE cannot be utilized for automatic host provisioning in a public cloud environment.

Hosts may be provisioned on a public cloud platform by deploying a custom-modified boot disk image for each host to be created on the public cloud. However, these solutions are time consuming, resource intensive, and burdensome for users. Moreover, in situations requiring provisioning of large numbers of hosts, manually creating and deploying a customized boot disk image for every host instance is impractical and potentially cost-prohibitive, among other drawbacks.

SUMMARY

One example provides a method for automatically provisioning a host in a cloud environment. A first boot of a cloud instance of a host is performed in accordance with a master boot image. The master boot image lacks configuration data specific to a given cloud instance of a host. When the first boot is complete, a cloud host-state configuration associated with the cloud instance of the host is retrieved from a cloud metadata service. The cloud host-state configuration is installed onto the master boot image to generate a self-configured boot image. A second boot of the cloud instance of the host is performed using the self-configured boot image to automatically provision the cloud instance of the host in the cloud environment in accordance with host-specific configuration data.

BRIEF DESCRIPTION OF THE DRAWINGS

Corresponding reference characters indicate corresponding parts throughout the drawings.

DETAILED DESCRIPTION

Figure 1:
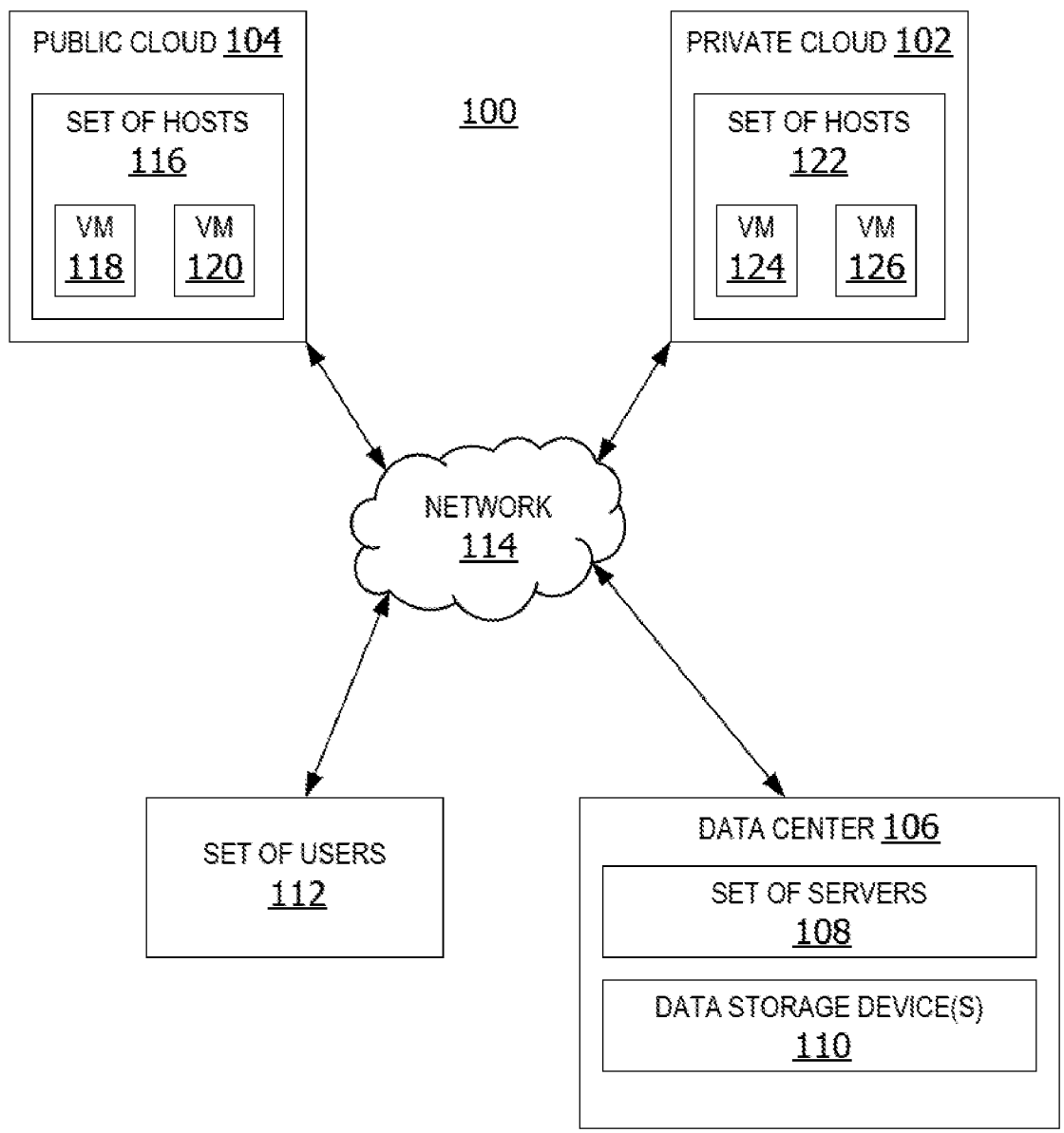
FIG. 1 is a block diagram of a hybrid cloud environment for provisioning hosts on a cloud.

Examples described herein provide automatic deployment and/or provisioning of one or more hosts supporting multiple virtual computing instances, such as, virtual machines (VMs) or containers within a cloud environment. The cloud environment may include a public cloud environment or a hybrid cloud environment. A hybrid cloud environment is an environment that includes a private cloud connected to a public cloud enabling a client to leverage both private cloud services and public cloud services.

A host supports a VM, a container, and/or any other virtual computing instances. A host may be implemented as a physical server, or as a cloud instance running within a cloud environment. A cloud instance of a host is a host running within a VM, a container, or other virtual computing instances. This may be implemented as a first hypervisor running within a VM, which is running over a second hypervisor, in some examples.

A cloud instance of a host runs within a VM, while supporting one or more other computing instances. A VM running within a cloud instance of a host may be referred to as a nested VM.

A cluster manager on a virtual controller in some examples boots a plurality of hosts using a standard, stateless master boot image. The master boot image is used to create a host without host-specific configuration data and/or state data. This simplifies provisioning of hosts to improve performance and reduce processor load.

In other examples, the master boot image is self-configuring. This self-configuring master boot image enables users to automatically provision cloud instances of a host without deploying custom-modified disk images for each host. The master boot image provisions one or more hosts on a public cloud more rapidly and with greater user efficiency.

In some non-limiting examples, the master boot image may be utilized to perform a first boot operation to create a cloud instance of a host. After the first boot is complete, a first boot script retrieves a host-specific, host-state configuration from a cloud storage and embeds the host-state configuration within the master boot image to generate a self-configured boot image. The self-configuring master boot image reduces memory usage and processor load.

The cloud storage in some examples is a per-VM cloud metadata service. A second boot of the cloud instance of the host is performed using the self-configured boot image. On completion of the second boot, the cloud instance of the host is fully provisioned on the cloud platform in accordance with the host-specific configuration data. This enables automatic provisioning of hosts on a cloud to simplify the automation of host deployment and improve user interactions with the system.

In still other examples, a cloud daemon running on the cloud platform generates a cloud host-state configuration including a host profile for each cloud instance of the host associated with the cloud platform. The cloud daemon stores the cloud host-state configurations on a cloud metadata service. This cloud daemon leverages existing cloud metadata services instead of building parallel ones. This avoids duplicating complex auto-deploy functionality on the cloud environment; thus improving host deployment efficiency and reducing resource usage.

In other examples, when the host-specific configuration data changes, a cloud daemon updates the host-state configuration on the cloud storage. The cluster manager retrieves the updated host-state configuration, replaces the first host-state configuration on the master boot image with the updated host-state configuration to create an updated boot image. The cluster manager reboots the cloud instance of the host using the updated boot image to update the provisioned host in accordance with the changed configuration data. In this manner, cloud instances of host(s) may be automatically updated while avoiding time consuming and costly alterations to existing virtual cloud infrastructures.

The utilization of a self-configuring master boot image in other examples enables upgrades to be made to a set of boot files on the master boot image to update software associated with all cloud instances of hosts. This enables simplified upgrade and compliance checking of the cloud instances of hosts.

FIG. 1 is a block diagram of a hybrid cloud environment for provisioning hosts. The cloud environment 100 in this example is a hybrid cloud environment including a private cloud 102, a public cloud 104, and/or an on-site data center 106 associated with at least one client.

The private cloud 102 in this non-limiting example is a cloud computing platform associated with proprietary architecture for delivering services to a single client, organization, or group. The private cloud 102 in some examples utilizes a local area network (LAN) to deliver cloud services to users.

The public cloud 104 provides services to multiple clients, organizations, businesses, or other groups. Cloud services provided by a public cloud are typically provided via a Wide Area Network (WAN) accessible to the public, such as the Internet. Non-limiting examples of a public cloud include Google Cloud Platform®, Microsoft Azure®, Amazon Web Services®, VMware vCloud®, Joyentcloud®, IBM Cloud®, or any other public or hybrid cloud services provider. VMware's vCloud Hybrid Services (vCHS) is an example of a hybrid cloud.

In still other examples, the data center 106 includes one or more structures or buildings for housing physical computing devices, such as a set of one or more servers 108 and data storage device(s) 110.

In some examples, the set of servers 108 includes a Rack Scale Architecture (RSA) housing a plurality of physical servers. In other examples, one or more servers in the set of servers is implemented as a blade server.

The data storage device(s) 110 in this non-limiting example includes one or more data storage devices.

The data storage device(s) 110 may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 110 may include rotational storage, such as a disk. The data storage device(s) 110 may also include non-rotational storage media, such as SSD or flash memory.

In some non-limiting examples, the data storage device(s) 110 provide a shared data store. The shared data store is a data storage accessible by two or more hosts in a host cluster. The host includes a host running VMs, as well as a host associated with one or more containers or other computing instances.

In this example, the data center 106 is associated with the public cloud 104. The data center provides physical computing devices for supporting and providing public cloud services delivered to the set of users 112. A set of users 112 access the public cloud 104 via a network 114. The network in this example is the Internet.

The public cloud 104 is not limited to a single data center. The public cloud 104 in some examples is supported by two or more data centers housing physical servers and data storage in one or more different geographic regions or locations.

The public cloud 104 in this example supports a set of hosts 116 running on the public cloud platform. The set of hosts in this example, supports one or more VMs, such as VM 126 and VM 128. In other examples, the set of hosts 116 includes a single VM. In still other examples, the set of hosts includes one or more containers.

The set of hosts 104 may include a host running on a physical machine, or a cloud instance of a host running on a VM or a container within the cloud. In one example, VM 118 and VM 120 are nested VMs running on one or more cloud instances of a host in the set of hosts. In these examples, the cloud instance of the host running VM 118 is running on another VM or container within the cloud.

The private cloud 102 in some examples may include a host running on a physical machine, or a cloud instance of a host running on a VM or a container within the cloud. The set of hosts 122 includes one or more cloud instances of a host. In one example, the set of hosts supports one or more VMs, such as, but not limited to, VM 124 and VM 126. In other examples, the set of hosts 122 supports one or more containers or other computing instances.

In these examples, the data center 106 provides physical computing devices for supporting and providing private cloud 102 services. The data center 106 may be connected to the private cloud and at least one client via a LAN, such as an Ethernet.

In this example, the public cloud 104 supports VMs. The public cloud 104 in other examples supports a set of one or more containers on the public cloud platform. In still other examples, the public cloud 104 includes VMs, containers, and/or any other virtual computing instance(s).

Figure 2:
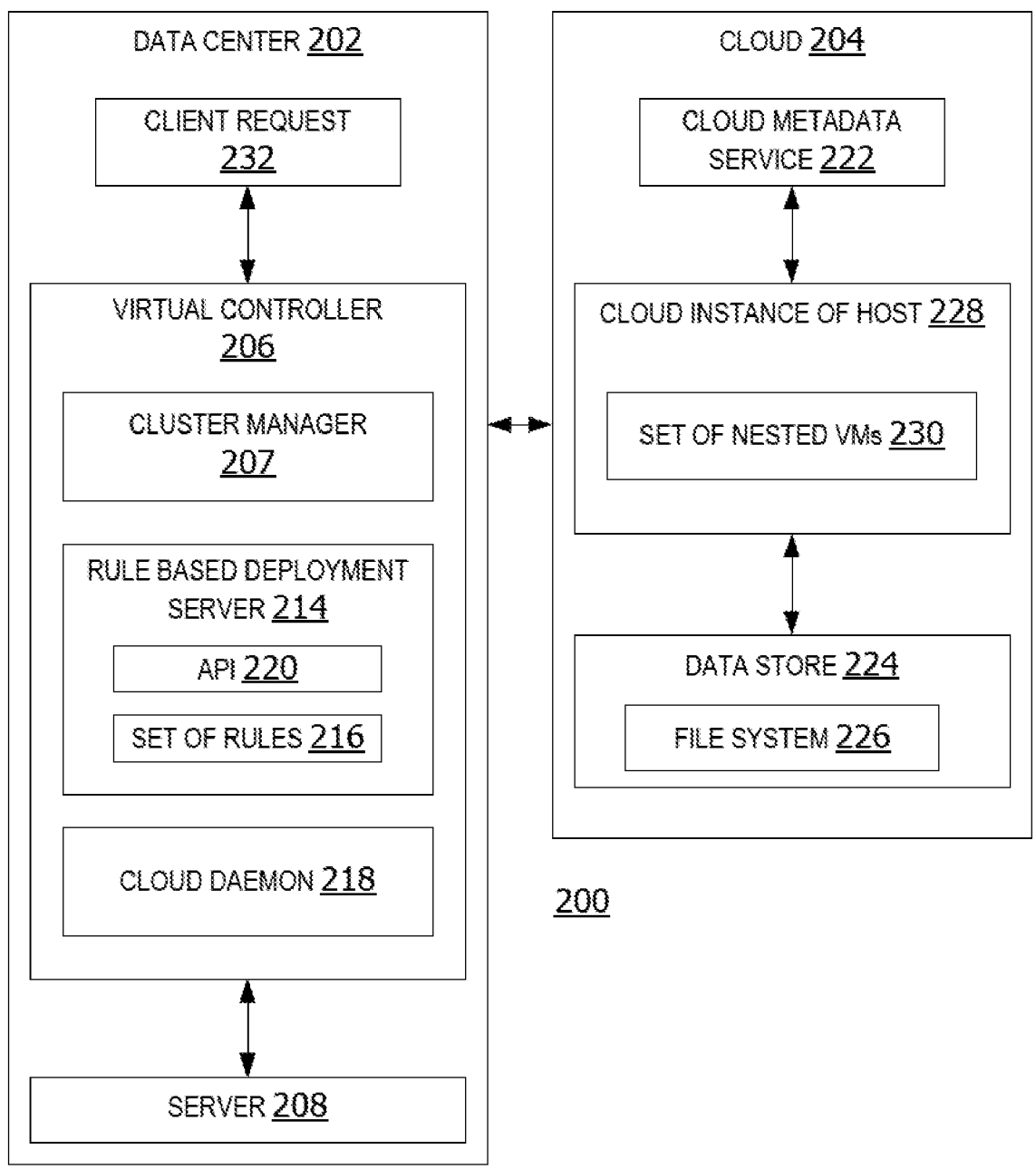
FIG. 2 is a block diagram illustrating a cloud environment for automatically provisioning hosts within the cloud environment.

FIG. 2 is a block diagram illustrating a cloud environment for automatically provisioning cloud instances of hosts. The cloud environment 200 in this example is a public cloud environment. However, in other examples, the cloud environment 200 is a hybrid cloud environment including a public cloud 204 and a private cloud (not shown).

The data center 202 is a facility for housing physical servers and/or data storage devices, such as data center 106 in FIG. 1. The data center 202 connects to the public cloud 204 via a network connection.

A virtual controller 206 in this example is a component for managing multiple servers (both physical hosts and cloud instances of hosts), such as, but not limited to, server 208.

The virtual controller 206 in some non-limiting examples, is implemented as a Virtual Center (vCenter) server from VMware, Inc.

In this example, the virtual controller 206 includes a cluster manager 207. The cluster manager 207 manages a cluster of hosts, which may include a physical host and/or one or more cloud instances of hosts. In still other examples, the cluster manager initiates and/or performs provisioning of hosts in the cloud environment. The provisioning of hosts includes instantiation of the hosts and/or VMs running on the host.

The server 208 is a physical server device. Further, the server 208 may represent a single host. Each host may optionally include one or more VMs or containers. Each host may be implemented with a hypervisor.

In some examples, the hypervisor is a VM monitor. The hypervisor may also be referred to as a VM manager. The hypervisor provides processor, memory and other hardware resources to the host and/or VMs running on the host. The hypervisor enables multiple VMs to run on a single host. In other examples, the host running on the server 208

A rule-based deployment (RBD) server 214 utilizes a set of rules 216 to create a host profile for a specific cloud instance of a host. In some examples, the set of rules 216 includes auto deploy rules for launching ESXi VMs in RBD on a local virtual controller server appliance (VCSA).

The host profile includes host-specific configuration data for a particular host or VM. The host-specific configuration data may include, without limitation, internet protocol (IP) addresses, MAC addresses, user passwords, administrator passwords, secure sockets layer (SSL) certificates, as well as other configuration data for a particular instance of a host or VM.

In this example, a cloud daemon 218 is a software component that queries the RBD server 214 for the host profile. In some examples, the cloud daemon is an agent running on the virtual controller.

The RBD generates the host profile in accordance with the set of rules and transmits the host profile to the cloud daemon via a set of one or more configuration files. In some examples, the host profile is transmitted to the cloud daemon via a waiter configuration file via an application programming interface (API) 220 or another interface associated with the RBD server. In some examples, the waiter file is a waiter.tgz file.

In some examples, the cloud daemon 218 uploads the host profile onto a cloud metadata service 222. In other examples, the cloud daemon 218 utilizes the host profile to create a cloud host-state configuration. The cloud host-state configuration is a set of one or more files including the host profile for a particular cloud instance. The cloud host-state configuration is stored on the cloud metadata service 222.

In some examples, storing the host-state on the cloud metadata service provides a simple hypertext transfer protocol (HTTP) mechanism to fetch at a known address for a host cloud instance. The cloud instance of the host has cloud local networking available when booted form the master boot image in the cloud environment.

In other examples, the cloud host-state configuration is stored on the data store 224. The data store 224 is associated with one or more data storage devices. The data store 224 may include databases, filesystem, files, or other collections of data. In some examples, the data store includes one or more cloud host-state configurations. The cloud metadata service stores a pointer to the location of the cloud host-state configuration stored on the cloud data store.

In some examples, the data store 224 includes one or more file systems, such as a file system 226. The cloud host-state configurations for one or more cloud instances of a host are stored on the file system 226 while the pointers to the cloud host-state configurations are stored on the cloud metadata service 222.

In still other examples, a master boot image is stored on the file system 226. The master boot image in this example is a stateless, generic boot image utilized to perform a first boot of every cloud instance of a host supported on the public cloud 204, such as cloud instance of host 228. The master boot image in some examples is a pre-registered, read-only, immutable master boot image.

The cloud instance of host 228 is a host running on the public cloud platform. In some examples, the cloud instance of host 228 is implemented as a hypervisor running on a VM or container. The cloud instance of host 228 in some examples may be referred to as a node, a host, a cloud server, a cloud host server, a VM cloud server, a host computing device, or a cluster server.

In other examples, a host is implemented as a cloud instance of Elastic Sky X (ESX) or ESXi host from VMware, Inc. VMware's ESX Server in some examples is manages memory and one or more central processing units (CPUs) between powered on VMs on an ESX host. In these examples, the virtual controller automatically provisions an ESX host on a cloud without forcing special knowledge of ESX in the cloud environment. In still other examples, the ESX host is compatible with cloud native applications, such as containers.

The master boot image utilized by the virtual controller, in some examples, provides a pseudo-stateless approach to host-state management. Rather than installing ESXi on a cloud environment virtual disk from an installer on first boot and having a mutable host disk to characterize the system's current state, a stateless approach is utilized. The entire host-state for a cloud instance is characterized by a set of files packed in a host-state configuration at boot time. The cloud host-state configuration is loaded into the root filesystem at boot time alongside the other virtual installation bundle files in the ESXi image profile.

The cloud instance of host 228 in this non-limiting example is a host running on the public cloud 204. The set of nested VMs 230 is a set of one or more VMs running on the cloud instance of the host 228 (which is itself running within another VM on the public cloud).

The virtual controller 206 in this example, automatically provisions the cloud instance of host 228 to run the set of nested VMs 230 on the public cloud in response to receiving a client request 232. In this manner, the virtual controller 206 enables automatic deploy services for provisioning of host and/or VMs on cloud environments.

In this example, the cloud instance of the host 228 includes the set of nested VMs 230. However, in other examples, the cloud instance of the host 228 includes a set of containers. The set of containers may further include additional containers.

The cloud environment in some examples is a hybrid cloud environment providing hosts running on an on-premises datacenter with additional computer/storage capacity provided by additional host cloud instances running in the cloud.

In some examples, the cloud environment does not support PXE network booting. If a boot disk image with loader sources its boot files from a standard automatic deploy server in these examples, it would require a user to add a transmission control protocol/internet protocol (TCP/IP)

stack and Network interface controller (NIC) support to mboot in the absence of PXE services. This also duplicates cloud metadata service. Instead, with the present disclosure, the cloud daemon in some examples places the cloud host-state files in the cloud metadata service. This enables booting in an absence of PXE, iPXE, and network booting.

Figure 3:
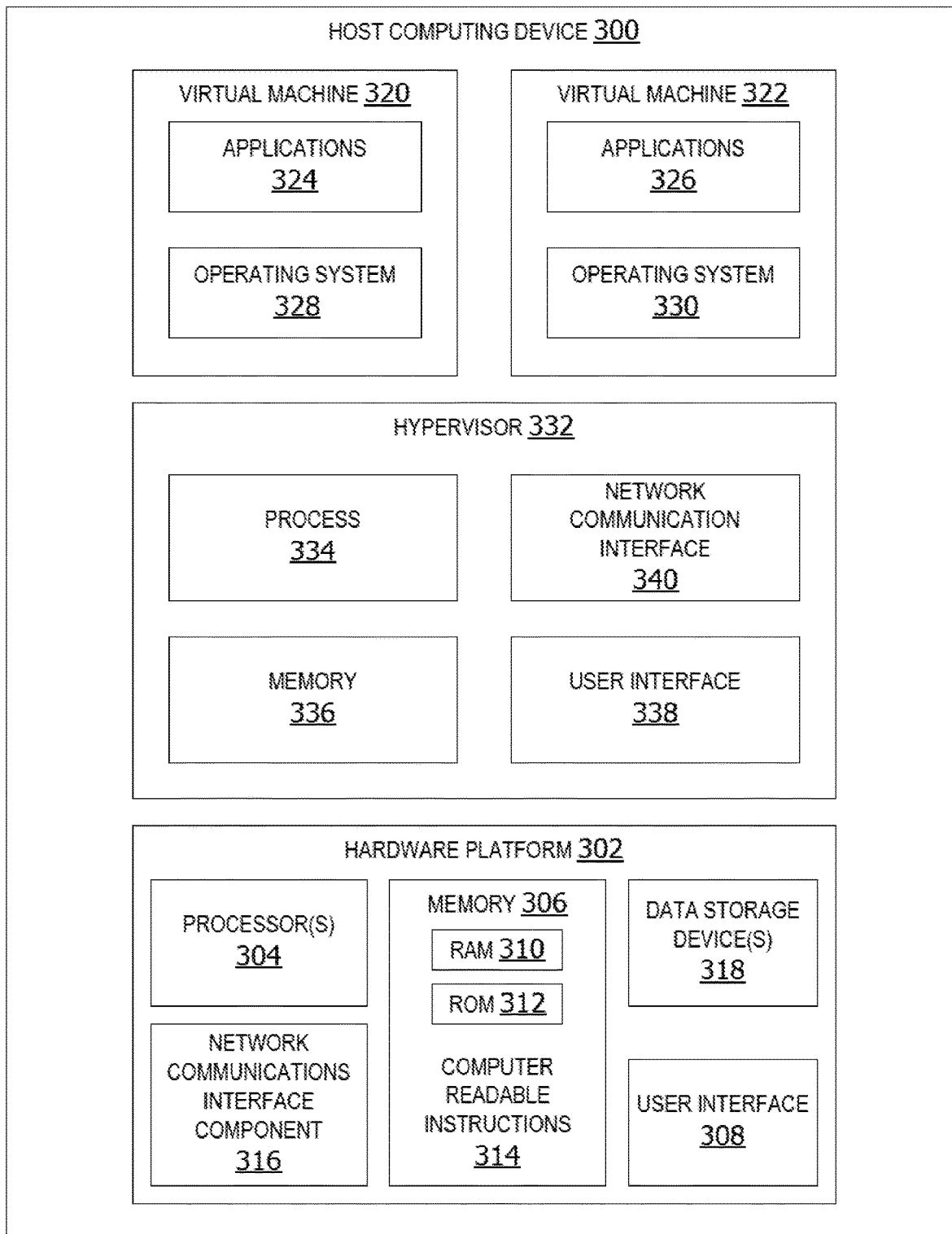
FIG. 3 is a block diagram of a host computing device.

FIG. 3 is a block diagram of a host computing device. The host computing device supports one or more hosts. Each host may support one or more VMs and/or one or more containers or other computing instances. The illustrated host computing device 300 may be implemented as any type of host computing device, such as a server. In some non-limiting examples, the host computing device 300 is implemented as an ESXi host from VMware, Inc.

The host computing device 300 represents any device executing instructions (e.g., as application(s), operating system, operating system functionality, or both) to implement the operations and functionality associated with the host computing device 300. The computing device 200 may include desktop personal computers, kiosks, tabletop devices, industrial control devices, wireless charging stations, or server.

In some examples, the host computing device 300 is implemented as one or more blade servers within a RSA. Additionally, the host computing device 300 may represent a group of processing units or other computing devices.

The host computing device 300 includes a hardware platform 302. The hardware platform 302, in some examples, includes one or more processor(s) 304, a memory 306, and at least one user interface, such as user interface component 308.

The processor(s) 304 includes any quantity of processing units, and is programmed to execute computer-executable instructions for implementing the examples. The instructions may be performed by the processor or by multiple processors within the host computing device 300, or performed by a processor external to the host computing device 300. In some examples, the one or more processors are programmed to execute instructions such as those illustrated in the figures (e.g., FIG. 10, FIG. 11, FIG. 12, and FIG. 13).

The host computing device 300 further has one or more computer readable media such as the memory 306. The memory 306 includes any quantity of media associated with or accessible by the host computing device 300. The memory 306 may be internal to the host computing device 300 (as shown in FIG. 3), external to the host computing device (not shown), or both (not shown). In some examples, the memory 306 includes read-only memory (ROM) 310.

The memory 306 further stores a random access memory (RAM) 312. The RAM 312 may be any type of random access memory. In this example, the RAM 312 is part of a shared memory architecture. In some examples, the RAM 312 may optionally include one or more cache(s). The memory 306 further stores one or more computer-executable instructions 314.

The host computing device 300 may optionally include a user interface 308 component. In some examples, the user interface 308 includes a graphics card for displaying data to the user and receiving data from the user. The user interface 308 may also include computer-executable instructions (e.g., a driver) for operating the graphics card. Further, the user interface 308 may include a display (e.g., a touch screen displays or natural user interface) and/or computer-executable instructions (e.g., a driver) for operating the display. The user interface component may also include one or more of the following to provide data to the user or receive data from the user: a speaker, a sound card, a camera, a microphone, a vibration motor, one or more accelerometers, a BLUETOOTH brand communication module, global positioning system (GPS) hardware, and a photoreceptive light sensor.

In some examples, the hardware platform 302 optionally includes a network communications interface component 316. The network communications interface component 316 includes a network interface card and/or computer-executable instructions (e.g., a driver) for operating the network interface card. Communication between the host computing device 300 and other devices may occur using any protocol or mechanism over any wired or wireless connection. In some examples, the communications interface is operable with short range communication technologies such as by using near-field communication (NFC) tags.

The data storage device(s) 318 may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 318 may include rotational storage, such as a disk. The data storage device(s) 318 may also include non-rotational storage media, such as SSD or flash memory. In some non-limiting examples, the data storage device(s) 218 provide a shared data store, such as shared data store 242 in FIG. 2.

The host computing device 300 hosts one or more VMs, such as VMs 320 and 322. The VM 320 in some examples, includes data such as, but not limited to, one or more application(s) 324.

The VM 322 in this example includes applications(s) 326. The application(s), when executed by the processor(s) 304, operate to perform functionality on the host computing device 300. Exemplary application(s) include, without limitation, mail application programs, web browsers, calendar application programs, address book application programs, messaging programs, media applications, location-based services, search programs, and the like. The application(s) may communicate with counterpart applications or services such as web services accessible via a network. For example, the applications may represent downloaded client-side applications that correspond to server-side services executing in a cloud.

In this example, each VM includes a guest operating system (OS). In this example, VM 320 includes guest operating system (OS) 328 and VM 322 includes guest OS 330.

The host computing device 300 further includes one or more computer executable components. Exemplary components include a hypervisor 332. The hypervisor 332 is a VM monitor that creates and runs one or more VMs, such as, but without limitation, VM 320 or VM 322. In other examples, the hypervisor 332 creates and runs one or more containers. In one example, the hypervisor 332 is implemented as a vSphere Hypervisor from VMware, Inc.

The host computing device 300 running the hypervisor 332 is a host machine. The VM 320 is a guest machine. The VM 320 may further run a cloud instance of a host, or nested VMs.

The hypervisor 332 presents the OS 328 of the VM 320 with a virtual hardware platform. The virtual hardware platform may include, without limitation, virtualized processor 334, memory 336, user interface device 338, and network communication interface 340. The virtual hardware platform, VM(s) and the hypervisor are illustrated and described in more detail in FIG. 15 below.

Figure 4:
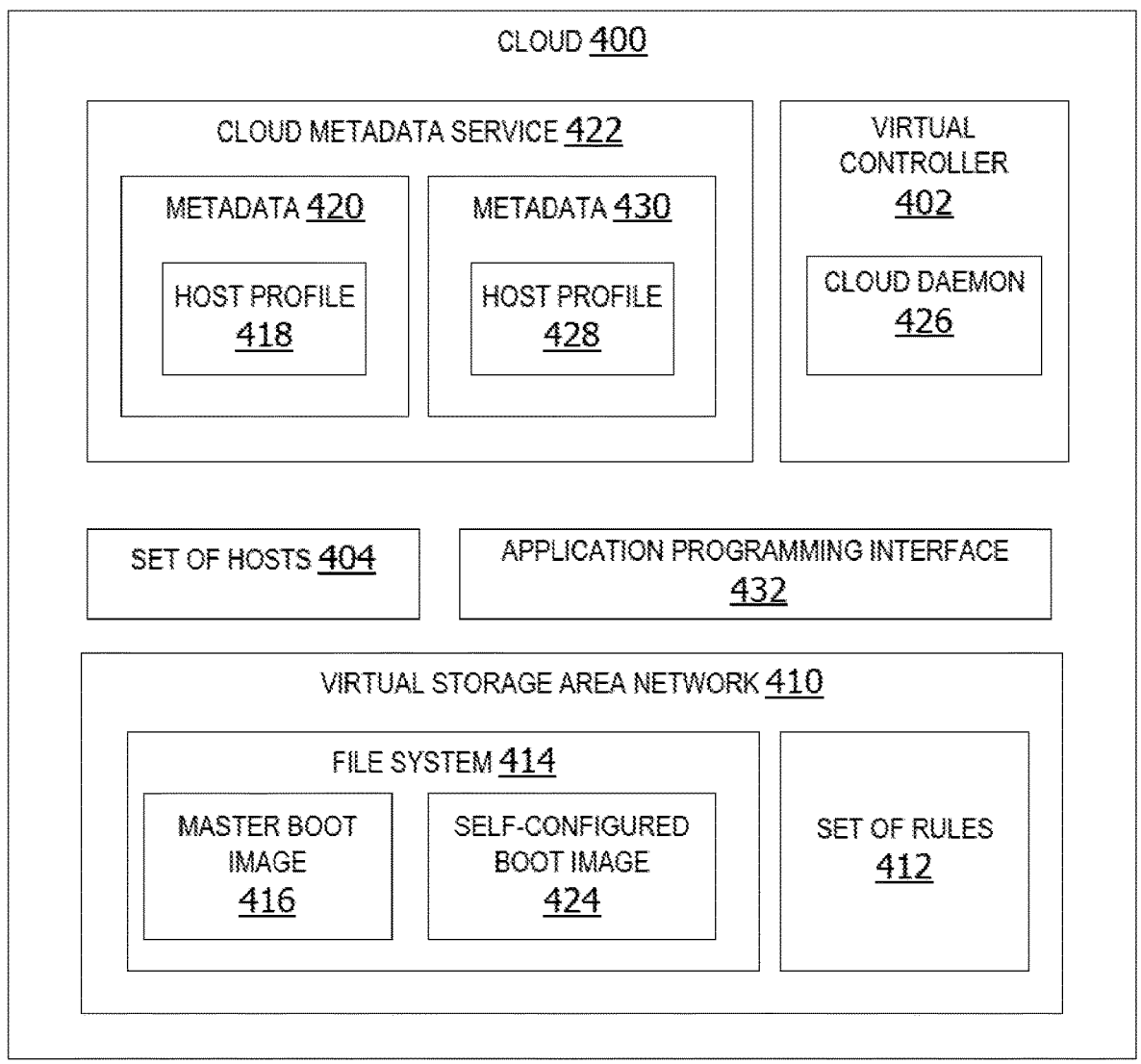
FIG. 4 is a block diagram illustrating a cloud environment supporting a set of hosts.

FIG. 4 is a block diagram illustrating a cloud environment supporting a set of hosts. The cloud 400 is a cloud platform associated with a public cloud or a hybrid cloud. The cloud 400 includes a cloud virtual controller 402 for creating and managing a set of hosts 404. In other words, the virtual controller may reside on an on-premises data center or reside entirely on the cloud.

The set of hosts 404 includes physical hosts, or one or more cloud instances of hosts running on the cloud environment. For example, the set of hosts 404 may include five cloud instances of a host or fifty cloud instances of a host. In other examples, the set of cloud instances of a host includes hundreds of hosts running on the cloud. A cloud instance of a host may host one or more VMs or one or more containers.

In some examples, the cloud 400 includes a virtual storage area network (vSAN) 410. The vSAN pools data storage for the set of cloud instances 404. In this example, the vSAN includes an image file system 414 storing a master boot image 416.

The master boot image 416 is a stateless, standard boot image for performing a first boot of all cloud instances in the set of cloud instances. The master boot image may be referred to as a master boot disk or source boot image. In some examples, the master boot image 416 is enabled to configure itself into a provisioned cloud instance of a host.

In this example, the master boot image 416 is executed by the virtual controller 402 to create a first cloud instance of host. Once the first boot of the first cloud instance of host is complete, a first boot script of the master boot image retrieves a host profile 418 from metadata 420 for the first cloud instance of host that is stored on a cloud metadata service 422.

The first boot script installs the host profile 418 onto the master boot image to generate a self-configured boot image 424 for the first cloud instance of the host. The virtual controller 402 then performs a second boot using the self-configured boot image 424 to provision the first cloud instance of the host in accordance with the configuration data provided in the host profile 418. The first boot script in some examples is modified to prevent the first boot script from executing during subsequent boots of the cloud instance of the host. In some non-limiting examples, the script is modified by removing the first boot script (e.g., and replace it with a host profile).

The first cloud instance of the host is then joined to the virtual controller 402. The virtual controller 402 monitors one or more workloads executing on the first cloud instance of the host.

In some examples, the virtual controller gains control over the cloud host-state data at boot time. This enables the virtual control to establish shared credentials when joining a cloud instance to the virtual controller. The shared credentials may include, without limitation, root passwords, SSL certificates, public and private keys, etc.).

A cloud daemon 426 monitors the host profile for changes. If a change occurs, the cloud daemon 426 updates the host profile 418 on the cloud metadata service 422.

In some examples, the cloud instance of the host queries the cloud metadata service 422 for changes to the cloud host-state. In other examples, a cluster manager on the virtual controller monitors the cloud metadata storage and queries the cloud metadata storage for changes to the cloud host-state configurations associated with cloud instances managed by the virtual controller.

If a change occurs, the updated cloud host-state is added to the self-configured boot image 424 to create an updated boot image. The first cloud instance of the host is then rebooted using the updated boot image.

In some examples, the cloud instance of the host initiates the reboot using the updated boot image. In other examples, a cluster manager of the virtual controller initiates the reboot using the updated boot image.

In this example, the host profile is downloaded from the cloud metadata service and installed into the master boot image. In other examples, a cloud host-state configuration, including the host profile, is downloaded from the cloud metadata service and installed on the master boot image to create the self-configured boot image.

In another example, the virtual controller 402 executes the master boot image again to boot up a second cloud instance of the host. The same master boot image is utilized for a first boot of host and any number of additional cloud instances. In other words, the same master boot image may be used to instantiate and provision every cloud instance. Once the first boot is complete, the host profile 428 in metadata 430 for the second cloud instance of the host is retrieved from the cloud metadata service 422.

The host profile 428 for the second cloud instance is installed on the master boot image 416 to create a second self-configured boot image. A second boot is then performed using the second self-configured boot image to reboot the second cloud instance of the host. Once the second boot is complete, the second cloud instance of the host is fully provisioned on the cloud in accordance with the host profile 428 for that second cloud instance. The second cloud instance of the host is also joined to the virtual controller 402.

Thus, in some examples, the master boot image is modified during bootstrap following the first boot, but a persistent, mutable disk state of the master boot image is not maintained between subsequent boots.

The cloud metadata service 422 is a service provided by the public cloud. The cloud metadata service stores metadata for hosts, VMs, and/or containers on a cloud metadata storage associated with at least one data store. The data store may be supported on one or more data storage devices associated with the public cloud.

In this example, an RBD generates the host profile for each cloud instance prior to performing the first boot of each of the cloud instances based on a set of rules 412 for automatically deploying hosts, VMs, containers, and/or other virtual computing instances on the cloud 400. The cloud daemon 426 retrieves the host profile from the RBD server and uploads them to the cloud metadata service 422.

In other examples, the cloud 400 includes one or more API(s) 432 or interfaces for sending and receiving data from one or more clients associated with the set of hosts 404.

Figure 5:
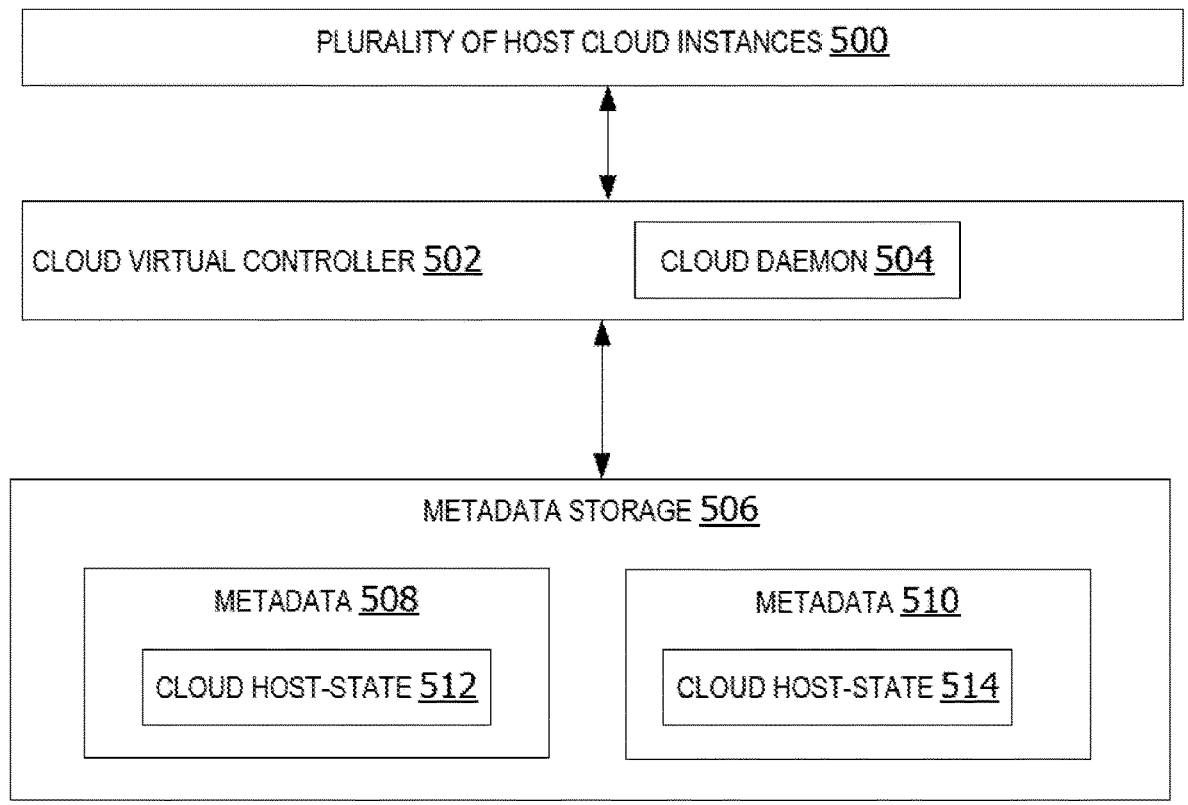
FIG. 5 is a block diagram illustrating a cloud virtual controller.

FIG. 5 is a block diagram illustrating a cloud virtual controller. In some examples, the plurality of hosts 500 includes one or more cloud instances of a host running on a VM. Each host is capable of serving one or more VMs, containers, or any other virtual computing instances. In some examples, a cloud instance of a host runs one or more nested VMs.

The cloud instances of hosts and/or VMs are managed by cloud virtual controller 502. The cloud virtual controller 502 is a virtual controller running on a VM on the cloud platform. The cloud virtual controller 502 includes a cloud daemon 504 in this example. The cloud daemon 504 uploads one or more cloud host-state configurations onto a cloud metadata storage 506. The cloud metadata storage 506 is a per-VM metadata service storing metadata for a cloud instances of hosts, VMs, containers, or any other virtual computing instances. In this example, metadata 508 for a first VM and/or metadata 510 for a host is stored on the metadata storage.

In some examples, the metadata includes a cloud host-state 512. The cloud host-state 512 is a set of one or more files containing host-specific configuration data, such as a host profile, for a VM, container, or other virtual computing instance. The cloud-host state is host-specific. In this example, the cloud host-state 512 is a set of one or more host-specific configuration files for a VM. The cloud host-state 514 is a set of one or more configuration files that are host-specific.

In some examples, a provisioned cloud instance of a host blocks inner, nested VMs from accessing the cloud metadata service to prevent leaking metadata to untrusted guests. Metadata which may be sensitive includes security keys, credentials, passwords, etc. In other examples, a provisioned cloud instance of a host blocks inner, nested VMs from accessing the RBD server to protect the host profile and other host-state data associated with the RBD server.

Figure 6:
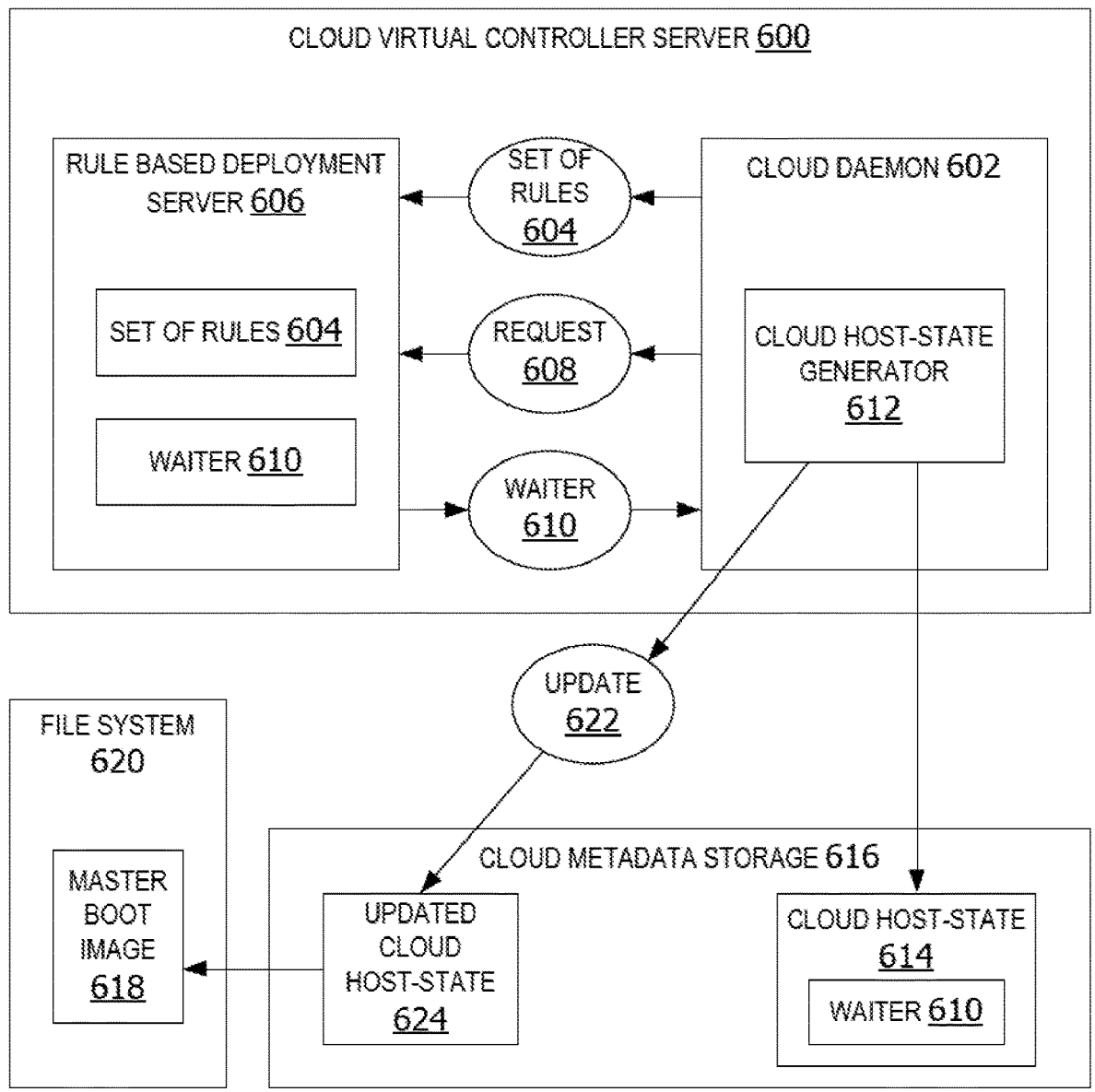
FIG. 6 is a block diagram illustrating a cloud daemon generating a cloud-host-state configuration.

FIG. 6 is a block diagram illustrating a cloud daemon generating a cloud-host-state configuration. The cloud virtual controller server 600 in some examples includes a cloud daemon 602. The cloud daemon 602 provides a set of rules 604 for automatically deploying cloud instances of hosts on the cloud to the RBD server 606. In this example, the cloud daemon 602 sends a request 608 to the RBD server 606 for a host profile for a given cloud instance of a host to be instantiated on the cloud. The RBD server generates the host profile in accordance with the set of rules 604.

The RBD server 606 packages the host profile in a waiter 610 file, such as a waiter.tgz file. The RBD server 606 provides the waiter 610 file to the cloud daemon 602.

The waiter file in some examples optionally includes other configuration data for the given cloud instance of the host, such as, but not limited to, an answer file, SSL certificates, license configuration, and other instance-specific configuration data. In still other examples, the waiter file includes the host profile, configuration data, and any cloud-specific scripts for facilitating provisioning of a particular cloud instance of a host.

In some examples, the administrator password is set by the host profile or answer file. The cloud host-state only contains the hashed password.

A cloud host-state generation component 612 of the cloud daemon 602 utilizes the host profile, answer file, and/or other configuration data provided in the waiter 610 file to generate a cloud instance specific, cloud host-state 614 configuration.

In this example, the cloud host-state configuration is a virtual installation bundle of one or more boot files containing per-host-state data. The cloud host-state configuration is provided at boot time.

The cloud daemon 602 loads the cloud host-state 614 onto the cloud metadata storage 616. In some examples, the cloud host-state configuration includes all of the contents of the waiter 610 file.

When the cloud virtual controller server 600 is ready to instantiate and provision a cloud instance of the host, the cloud virtual controller server 600 performs a first boot of the cloud instance of the host using a master boot image 618. In some examples, the master boot image 618 is a stateless boot image stored on a file system 620. The master boot image 618 is an immutable boot image utilized for performing a first boot of all hosts provisioned on the cloud.

After completion of the first boot, a first boot module of the master boot image is replaced with the cloud host-state 614 to generate a self-configured boot image. A second boot of the cloud instance of the host is performed using the self-configured boot image. The self-configured boot image is a custom boot image automatically generated by the virtual controller for booting and provisioning the cloud instance of the host in a two-phase boot process. The first boot phase is performed using the standard, master boot image for booting every cloud instance of the host during the first boot phase. The second boot phase is performed using the host-specific, self-configured boot image.

After completion of the second boot, the provisioned cloud instance of the host is joined to the virtual controller. In some examples, the cloud instance of the host is joined to the virtual controller by the RBD server using known credentials inserted in the waiter file when a standard RBD host CGI server up-call is received from the boot cloud instance of the host. In some examples, the up-call is initiated by the execution of a waiter-notify process.

The cloud instance in some examples begins running one or more workloads following joining to the virtual controller. A workload is a set of processes to be executed on the cloud instance. The cloud daemon monitors the cloud instance of the host for changes to the host profile or other configuration data associated with the given cloud instance host-state. If a change to host-state occurs, the cloud daemon performs an update 622 of the cloud host-state on the cloud metadata storage 616. The updated cloud host-state 624 is installed on the master boot image 618 to generate an updated boot image for the given cloud instance of the host. On a next reboot of the host, the updated boot image is executed to automatically provision the cloud instance of the host in accordance with the updated cloud host-state data.

In some examples, the host's SSL keys embedded in the waiter file do not match the hostname of the cloud instance because they are fetched locally on the virtual controller server by the cloud daemon. The RBD server corrects this at boot time with a re-key call allowing a host to request new SSL certificates to match its observed runtime hostname.

In other examples, the master boot image 618 is utilized to automatically provision a nested VM (e.g., a VM on a cloud instance of a host, which itself runs within another VM). In this example, the cloud daemon 602 sends a request 608 to the RBD server 606 for a host profile for the VM to be instantiated. The RBD server generates the host profile in accordance with the set of rules 604 and packages the host profile in the waiter 610 file. The RBD server 606 provides the waiter 610 file to the cloud daemon 602. The cloud daemon 602 utilizes the configuration data provided in the waiter 610 file to generate the cloud host-state 614 configuration.

In this example, the cloud daemon 602 loads the cloud host-state 614 onto the cloud metadata storage 616. The cloud virtual controller server 600 performs a first boot of the VM using the master boot image 618. After completion of the first boot, the first boot module is replaced with the cloud host-state 614 to generate a self-configured boot image for the VM. A second boot of the VM is performed using the self-configured boot image. The provisioned VM is joined to the virtual controller.

Figure 7:
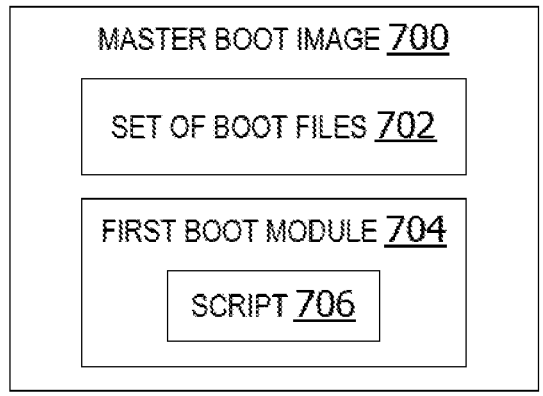
FIG. 7 is a block diagram illustrating a master boot image.

FIG. 7 is a block diagram illustrating a master boot image. In this non-limiting example, the master boot image 700 is a standard boot disk image used as a source image for every boot disk of a host. The master boot image 700 includes a set of boot files 702 and a first boot module 704 on the boot partition. The set of boot files 702 is a set of one or more base boot files for performing a bootstrap operation on a cloud instance of a host. In some examples, the set of boot files 702 includes a virtual installation bundle (VIB).

The first boot module 704 is a set of one or more boot files that are run during a first boot of a cloud instance of a host. The first boot module 704 is not executed on a second boot or any other subsequent boot of a cloud instance after the initial first boot.

The first boot module 704 in some examples includes a first boot script 706. The first boot script is executed after completion of the first boot. The script 706 fetches the cloud host-state configuration for a particular cloud instance of a host from the metadata storage on the cloud. The script 706 replaces the first boot module 704 with the cloud host-state configuration to generate the self-configured boot image.

In other examples, the script 706 checks the cloud metadata storage for a pointer to the cloud host-state configuration. The pointer in the cloud metadata storage identifies a location of the cloud host-state configuration on the data store. In other examples, the cloud host-state configuration is stored in a cloud instance specific file system for the given cloud instance of the host. The cloud instance specific file system in some examples is located in the data store.

The cloud metadata storage metadata size may be limited. For example, a metadata size may be limited to 32 kilobytes. In these examples, the cloud host-state is split into a set of two or more cloud host-state files. The script 706 retrieves a set of two or more cloud host-state files from the metadata storage of the cloud environment. The script 706 concatenates the set of cloud host-state files into a single cloud host-state configuration for installation onto the master boot image.

In still other examples, the script checks for one or more pointers on the cloud metadata storage. The pointer(s) indicate a storage location of two or more cloud host-state files. The script 706 concatenates the two or more cloud host-state files to generate the cloud host-state configuration.

The master boot image 700 includes the first boot VIB on the boot partition alongside other VIBs in the raw image. In some examples, the master boot image does not provide image profile customization on the cloud environment because the master boot image is running on a constrained nested environment. Instead, the first boot module automatically pulls a host profile from the cloud onto the master boot image.

Figure 8:
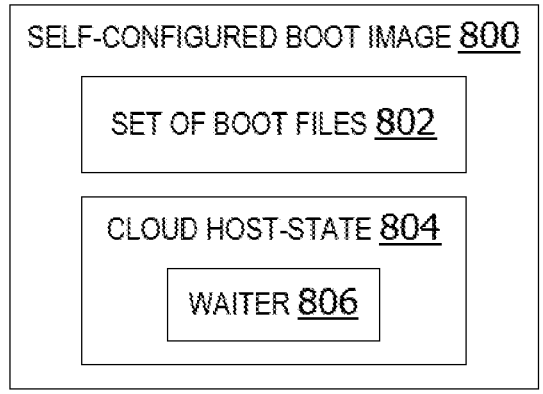
FIG. 8 is a block diagram illustrating a self-configured boot image.

FIG. 8 is a block diagram illustrating a self-configured boot image. The self-configured boot image 800 includes the set of boot files 802. The set of boot files 802 includes all the boot files included in the master boot image. Thus, the cloud instance of the host is rebooted with the same set of VIBs in the set of boot files 802 in a manner similar to having been auto-deployed. The self-configured boot image in some examples also includes the cloud host-state 804. The cloud host-state configuration in this examples includes all the contents of the waiter 806 file.

Figure 9:
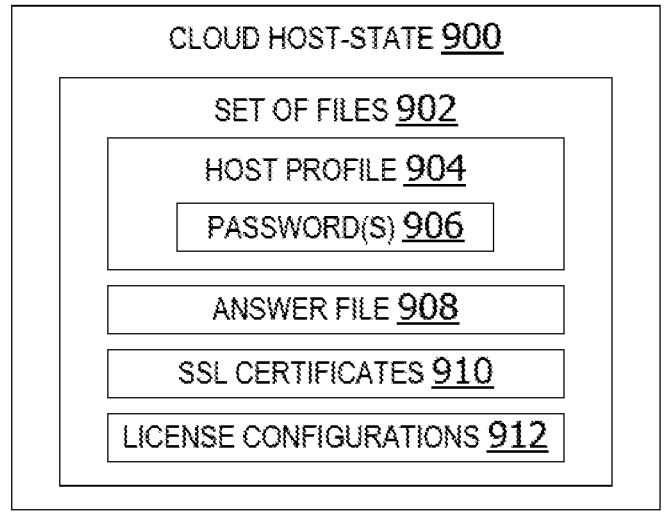
FIG. 9 is a block diagram illustrating a cloud host-state configuration.

FIG. 9 is a block diagram illustrating a cloud host-state configuration. A cloud host-state 900 includes a set of host-specific configuration files, such as set of files 902. The set of files in this example includes a host profile 904 including one or more passwords 906. The password(s) 906 may include a user password, an administrator password, or any other passwords.

The set of files 902 optionally also includes an answer file 908, a SSL certificates 910 file, and/or an instance-specific configuration data 912. The other configuration data 912 may include, without limitation, a media access control (MAC) address, license configuration, public and private keys, or any other configuration data.

Figure 10:
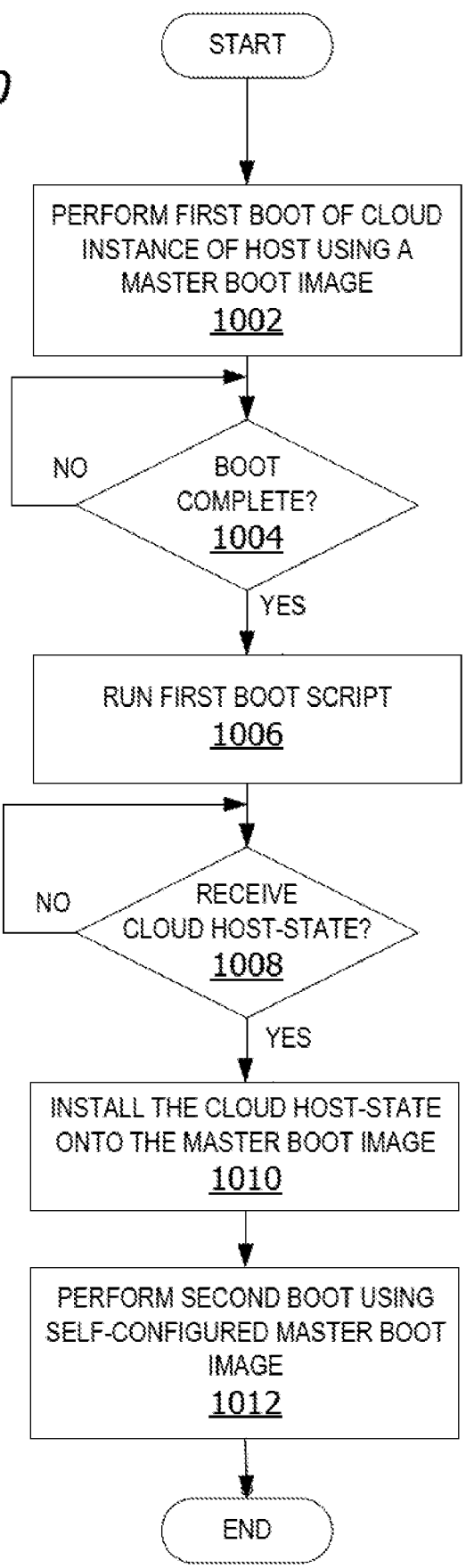
FIG. 10 is a flowchart of a process for configuring a cloud instance of a host in a cloud environment.

FIG. 10 is a flowchart of a process for configuring a cloud instance of a host in a cloud environment. The process shown in FIG. 10 may be performed by a server or virtual controller, such as, but not limited to, virtual controller 206 in FIG. 2, virtual controller 402 in FIG. 4, cloud virtual controller 522 in FIG. 5, or cloud virtual controller server 600 in FIG. 6. Further, execution of the operations illustrated in FIG. 10 is not limited to a virtual controller. One or more computer-readable storage media storing computer-readable instructions may execute to cause at least one processor to implement the operations illustrated in FIG. 10.

A first boot of the cloud instance of the host is performed using a master boot image at 1002. A determination is made as to whether the first boot is complete at 1004. If yes, a first boot script is run at 1006. If not, the process re-checks until completion of the first boot.

A determination is made as to whether a cloud host-state is received at 1008. If yes, the cloud host-state is installed onto the master boot image at 1010. A second boot of the cloud instance of the host is performed using the self-configured boot image at 1012. The process terminates thereafter.

The process shown in FIG. 10 is described as being performed to instantiate a host on a cloud environment. However, in other examples, the process shown in FIG. 10 may be utilized to instantiate a VM, container, or other virtual computing instance in the cloud environment.

While the operations illustrated in FIG. 10 are described as being performed by one or more cloud server computing devices associated with a public or hybrid cloud service, aspects of the disclosure contemplate performance of the operations by other entities. For example, an on-premises host computing device or private cloud server may perform one or more of the operations.

Figure 11:
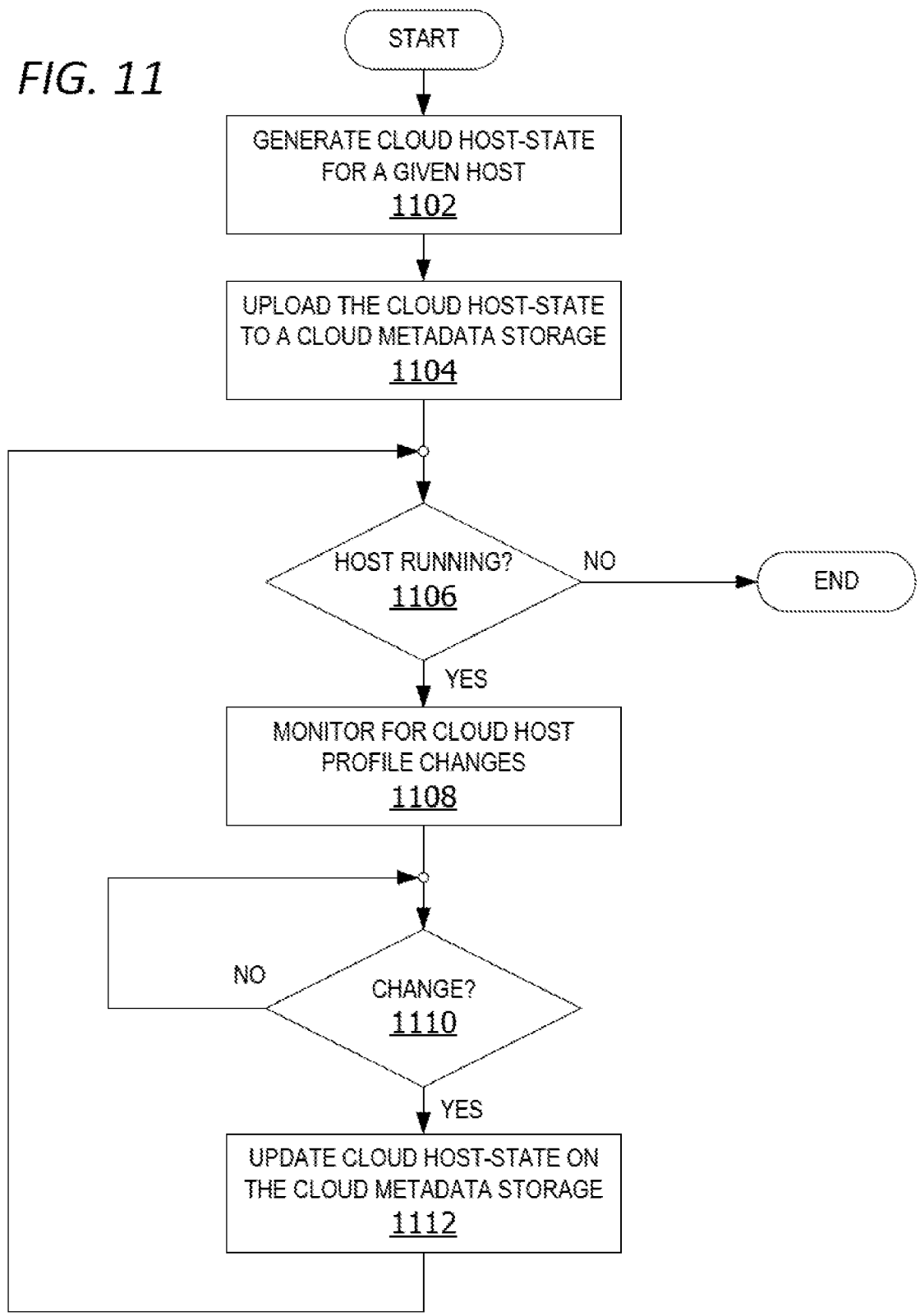
FIG. 11 is a flowchart of a process for generating an updated cloud host-state configuration on a cloud metadata storage.

FIG. 11 is a flowchart of a process for generating an updated cloud host-state configuration on a cloud metadata storage. The process shown in FIG. 11 may be performed by a server or virtual controller, such as, but not limited to, virtual controller 206 in FIG. 2, virtual controller 402 in FIG. 4, cloud virtual controller 522 in FIG. 5, or cloud virtual controller server 600 in FIG. 6. Further, execution of the operations illustrated in FIG. 11 is not limited to a virtual controller. One or more computer-readable storage media storing computer-readable instructions may execute to cause at least one processor to implement the operations illustrated in FIG. 11.

A cloud host-state configuration is generated for a given cloud instance of a host at 1102. The cloud host-state configuration is uploaded to a cloud metadata storage at 1104. A determination is made as to whether the given cloud instance of the host is running on the cloud at 1106. If no, the process terminates thereafter.

If the cloud instance of the host is running on the cloud, the virtual controller is monitored for changes to the cloud host profile at 1108. If a change occurs at 1110, the cloud host-state stored on the cloud metadata storage is updated at 1112. The process terminates thereafter.

The process in FIG. 11 is described as generating a cloud host-configuration for a cloud instance of a host. However, in other examples, the process shown in FIG. 11 is implemented to generate a cloud host-configuration for a VM, container, or other virtual computing instance on a cloud.

While the operations illustrated in FIG. 11 are described as being performed by one or more cloud server computing devices associated with a public or hybrid cloud service, aspects of the disclosure contemplate that performance of the operations by other entities. For example, an on-premises host computing device or private cloud server may perform one or more of the operations.

Figure 12:
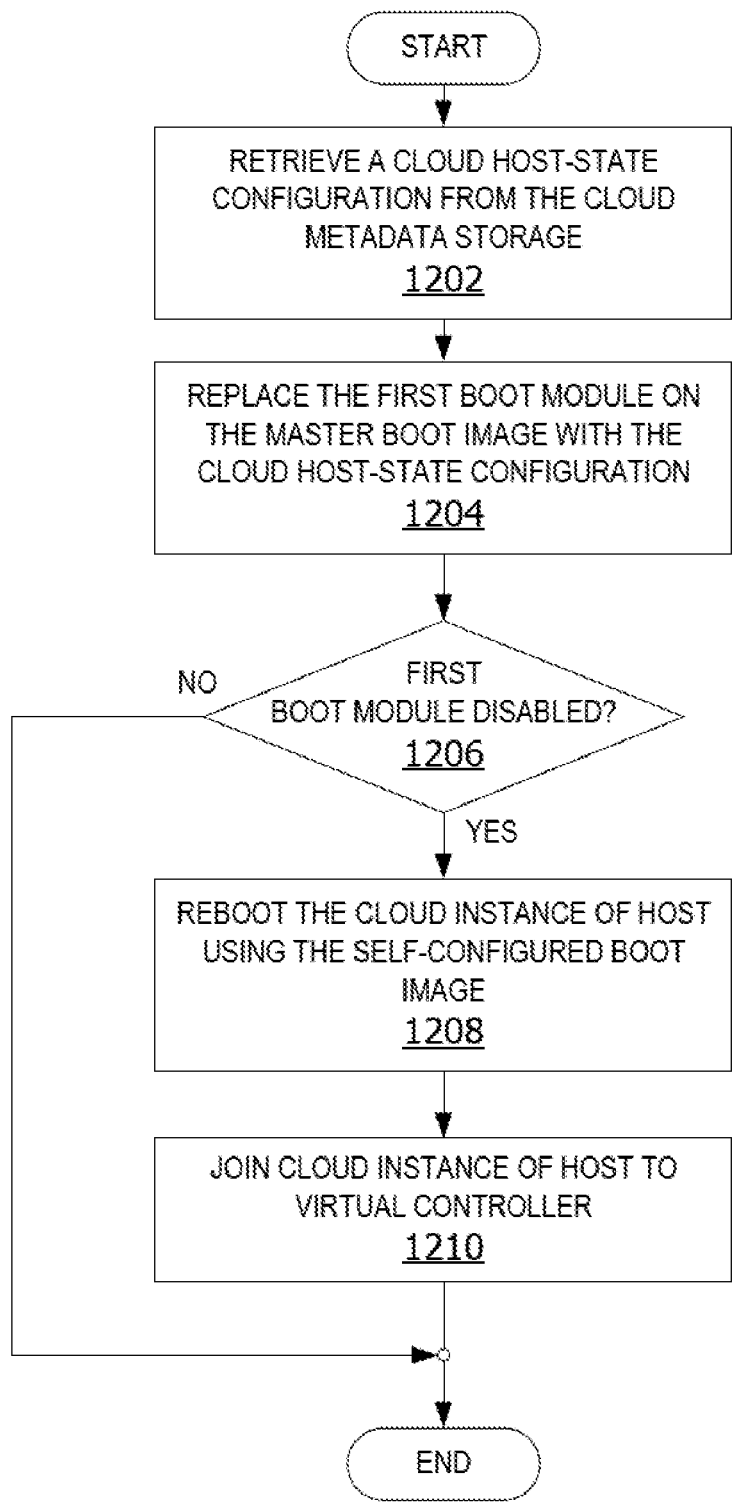
FIG. 12 is a flowchart of a process automatically provisioning cloud instances of a hosts.

FIG. 12 is a flowchart of a process automatically provisioning cloud instances of a host. The process shown in FIG. 12 may be performed by a server or virtual controller, such as, but not limited to, virtual controller 206 in FIG. 2, virtual controller 402 in FIG. 4, cloud virtual controller 522 in FIG. 5, or cloud virtual controller server 600 in FIG. 6. Further, execution of the operations illustrated in FIG. 12 is not limited to a virtual controller. One or more computer-readable storage media storing computer-readable instructions may execute to cause at least one processor to implement the operations illustrated in FIG. 12.

A cloud host-state configuration is retrieved from the cloud metadata storage at 1202. The first boot module on the master boot image is replaced with the cloud host-state configuration at 1204. A determination is made as to whether the first boot module is disabled at 1206. If no, the process terminates thereafter.

If the first boot module is disabled at 1206, the cloud instance of the host is rebooted using the self-configured boot image at 1208. The cloud instance is joined to the virtual controller at 1210. The process terminates thereafter.

The process shown in FIG. 12 is described as being implemented for provisioning a cloud instance of a host. In other examples, the process of FIG. 12 is utilized to provision a VM, a container, or other virtual computing instance, including, but not limited to, a nested VM running on a cloud instance of a host.

While the operations illustrated in FIG. 12 are described as being performed by one or more cloud server computing devices associated with a public or hybrid cloud service, aspects of the disclosure contemplate that performance of the operations by other entities. For example, an on-premises host computing device or private cloud server may perform one or more of the operations.

Figure 13:
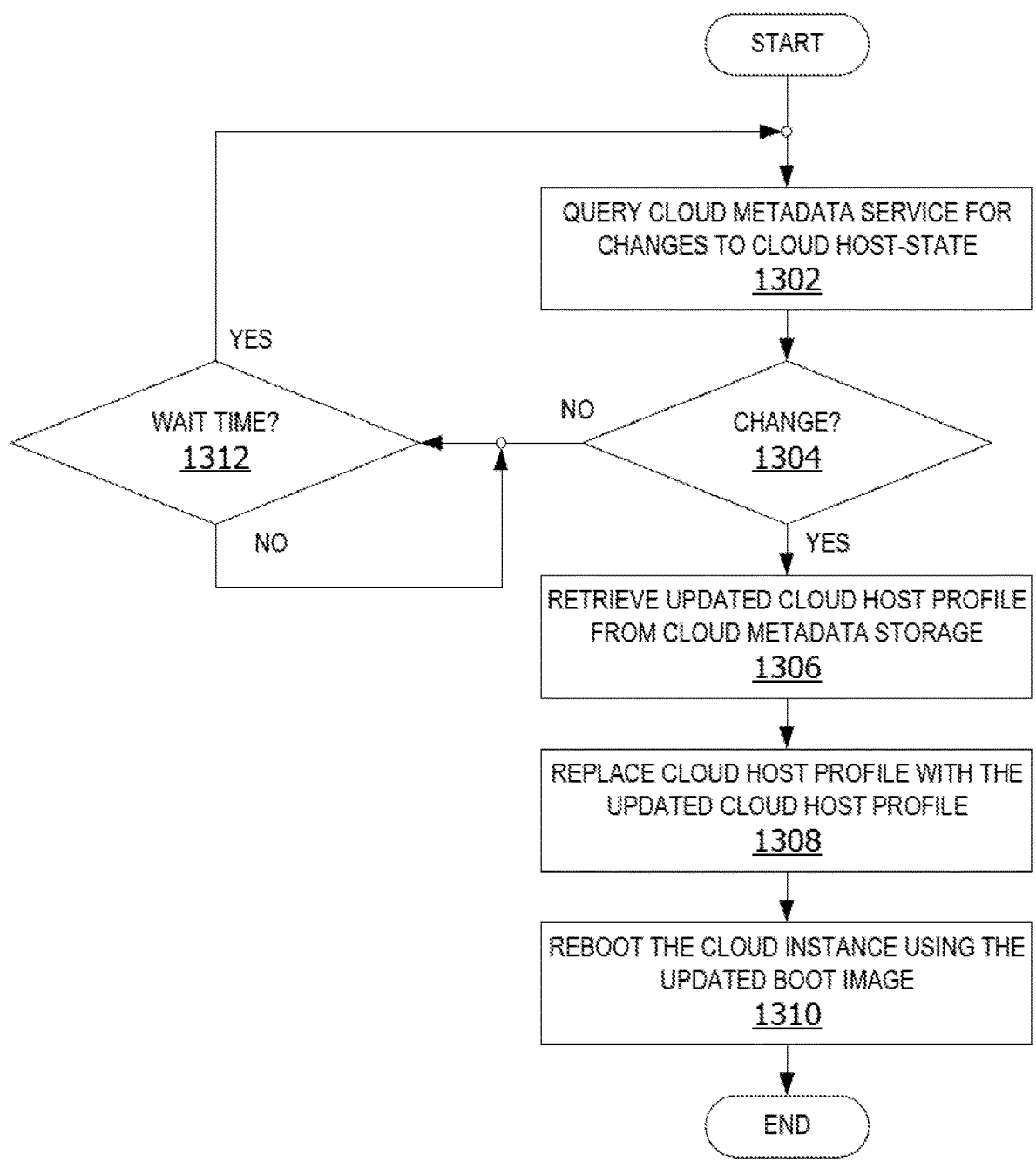
FIG. 13 is a flowchart of a process for generating an updated boot image.

FIG. 13 is a flowchart of a process for generating an updated boot image. The process shown in FIG. 13 may be performed by a server or virtual controller, such as, but not limited to, virtual controller 206 in FIG. 2, virtual controller 402 in FIG. 4, cloud virtual controller 522 in FIG. 5, or cloud virtual controller server 600 in FIG. 6. Further, execution of the operations illustrated in FIG. 13 is not limited to a virtual controller. One or more computer-readable storage media storing computer-readable instructions may execute to cause at least one processor to implement the operations illustrated in FIG. 13.

A cloud metadata service is queried for changes to the cloud host-state at 1302. A determination is made as to whether a change has occurred at 1304. If yes, an updated cloud host-state is retrieved from the cloud metadata storage at 1306. The cloud host profile on the self-configured boot image is replaced with the updated cloud host-state at 1308 to generate an updated boot image. The cloud instance of a host is rebooted using the updated boot image at 1310. The process terminates thereafter.

Returning to 1304, if a change has not occurred, a determination is made as to whether a wait time has passed at 1312. If yes, the virtual controller queries the cloud metadata service for changes to the cloud host-state at 1302. When a change occurs, operations 1306 through 1310 are executed. The process terminates thereafter.

While the operations illustrated in FIG. 13 are described as being performed by one or more cloud server computing devices associated with a public or hybrid cloud service, aspects of the disclosure contemplate that performance of the operations by other entities. For example, an on-premises host computing device or private cloud server may perform one or more of the operations.

Figure 14:
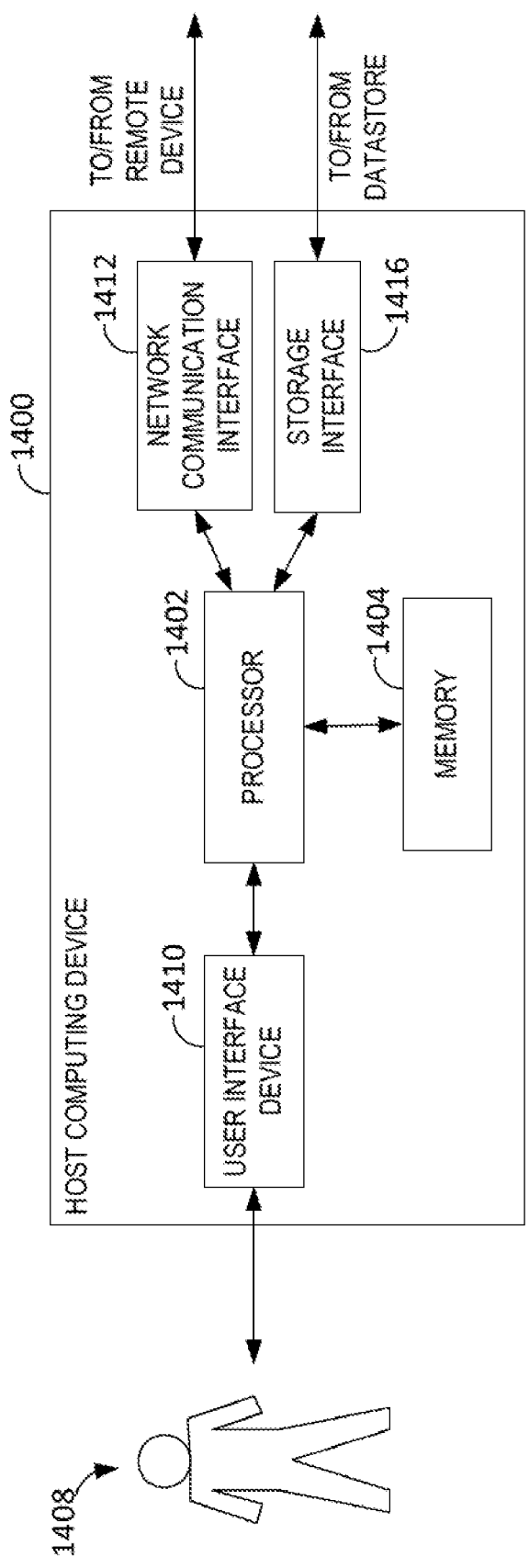
FIG. 14 is a block diagram of an exemplary host computing device.

FIG. 14 is a block diagram of an example host computing device. A host computing device 1400 includes a processor 1402 for executing instructions. In some examples, executable instructions are stored in a memory 1404. Memory 1404 is any device allowing information, such as, but not limited to, executable instructions, to be stored and retrieved. For example, memory 1404 may include one or more random access memory (RAM) modules, flash memory modules, hard disks, solid state disks, and/or optical disks.

Host computing device 1400 may include a user interface device 1410 for receiving data from a user 1408 and/or for presenting data to user 1408. User 1408 may interact indirectly with host computing device 1400 via another computing device such as VMware's vCenter Server or another management device. User interface device 1410 may include, for example, a keyboard, a pointing device, a mouse, a stylus, a touch sensitive panel (e.g., a touch pad or a touch screen), a gyroscope, an accelerometer, a position detector, and/or an audio input device.

In some examples, the user interface device 1410 operates to receive data from the user 1408, while another device (e.g., a presentation device) operates to present data to user 1408. In other examples, the user interface device 1410 has a single component, such as a touch screen, that functions to both output data to user 1408 and receive data from the user 1408. In such examples, the user interface device 1410 operates as a presentation device for presenting information to user 1408. In such examples, the user interface device 1410 represents any component capable of conveying information to user 1408. For example, the user interface device 1410 may include, without limitation, a display device (e.g., a liquid crystal display (LCD), organic light emitting diode (OLED) display, or "electronic ink" display) and/or an audio output device (e.g., a speaker or headphones). In some examples, the user interface device 1410 includes an output adapter, such as a video adapter and/or an audio adapter. An output adapter is operatively coupled to the processor 1402 and configured to be operatively coupled to an output device, such as a display device or an audio output device.

The host computing device 1400 also includes a network communication interface 1512, which enables the host computing device 1400 to communicate with a remote device (e.g., another computing device) via a communication medium, such as a wired or wireless packet network. For example, the host computing device 1400 may transmit and/or receive data via the network communication interface 1412. The user interface device 1410 and/or network communication interface 1412 may be referred to collectively as an input interface and may be configured to receive information from the user 1408.

The host computing device 1400 further includes a storage interface 1416 that enables the host computing device 1400 to communicate with one or more data stores, which store virtual disk images, and/or software applications suitable for use with the methods described herein. In example examples, the storage interface 1416 couples the host computing device 1400 to a storage area network (SAN) (e.g., a Fibre Channel network) and/or to a network-attached storage (NAS) system (e.g., via a packet network). The storage interface 1416 may be integrated with network communication interface 1412.

Figure 15:
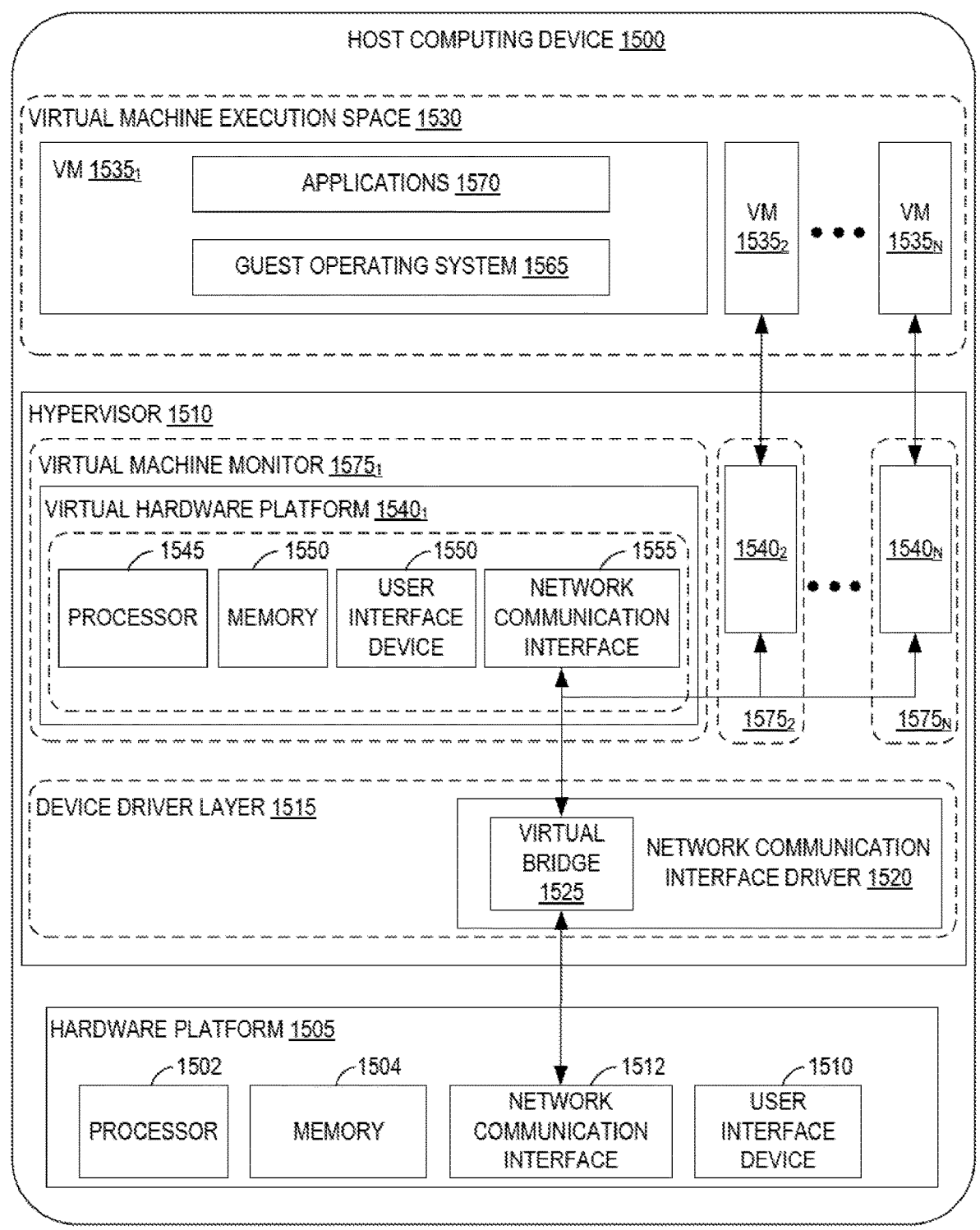
FIG. 15 is a block diagram of an exemplary host computing device supporting one or more VMs.

FIG. 15 depicts a block diagram of VMs $1535_1$, $1535_2$ . . . $1535_N$ that are instantiated on host computing device 1500. The host computing device 1500 includes a hardware platform 1505, such as an x86 architecture platform. The hardware platform 1505 may include a processor 1502, memory 1504, network communication interface 1512, user interface device 1510, and other input/output (I/O) devices, such as a presentation device 1506. A virtualization software layer is installed on top of the hardware platform 1505. The virtualization software layer in this example includes a hypervisor 1510, The virtualization software layer supports a VM execution space 1530 within which multiple VMs (VMs $1535_1$-$1535_N$) may be concurrently instantiated and executed. Hypervisor 1510 includes a device driver layer 1515, and maps physical resources of the hardware platform 1505 (e.g., processor 1502, memory 1504, network communication interface 1512, and/or user interface device 1510) to "virtual" resources of each of the VMs $1535_1$-$1535_N$ such that each of the VMs $1535_1$-$1535_N$ has its own virtual hardware platform (e.g., a corresponding one of virtual hardware platforms $1540_1$-$1540_N$), each virtual hardware platform having its own emulated hardware (such as a processor 1545, a memory 1550, a network communication interface 1555, a user interface device 1560 and other emulated I/O devices in VM $1535_1$). Hypervisor 1510 may manage (e.g., monitor, initiate, and/or terminate) execution of VMs $1535_1$-$1535_N$ according to policies associated with hypervisor 1510, such as a policy specifying that VMs $1535_1$-$1535_N$ are to be automatically respawned upon unexpected termination and/or upon initialization of hypervisor 1510. In addition, or alternatively, the hypervisor 1510 may manage execution VMs $1535_1$-$1535_N$ based on requests received from a device other than host computing device 1501. For example, the hypervisor 1510 may receive an execution instruction specifying the initiation of execution of first VM $1535_1$ from a management device via the network communication interface 1512 and execute the execution instruction to initiate execution of first VM $1535_1$.

In some examples, the memory 1550 in the first virtual hardware platform $1540_1$ includes a virtual disk that is associated with or "mapped to" one or more virtual disk images stored on a disk (e.g., a hard disk or solid state disk) of the host computing device 1500. The virtual disk image represents a file system (e.g., a hierarchy of directories and files) used by the first VM $1535_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

The device driver layer 1515 includes, for example, a communication interface driver 1720 that interacts with the network communication interface 1512 to receive and transmit data from, for example, a LAN connected to the host computing device 1500. The communication interface driver 1520 also includes a virtual bridge 1525 that simulates the broadcasting of data packets in a physical network received from one communication interface (e.g., network communication interface 1512) to other communication interfaces (e.g., the virtual communication interfaces of VMs $1535_1$-$1535_N$). Each virtual communication interface for each VM $1535_1$-$1535_N$, such as the network communication interface 1555 for the first VM $1535_1$, may be assigned a unique virtual MAC address that enables virtual bridge 1525 to simulate the forwarding of incoming data packets from the network communication interface 1512. In an example, the network communication interface 1512 is an Ethernet adapter that is configured in "promiscuous mode" such that all Ethernet packets that it receives (rather than just Ethernet packets addressed to its own physical MAC address) are passed to virtual bridge 1525, which, in turn, is able to further forward the Ethernet packets to VMs $1535_1$-$1535_N$. This configuration enables an Ethernet packet that has a virtual MAC address as its destination address to properly reach the VM in the host computing device 1500 with a virtual communication interface that corresponds to such virtual MAC address.

The virtual hardware platform $1540_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1565 in order to execute applications 1570 for an instantiated VM, such as the first VM $1535_1$. The virtual hardware platforms $1540_1$-$1540_N$ may be considered to be part of the VM monitors (VMM) $1575_1$-$1575_N$ that implement virtual system support to coordinate operations between the hypervisor 1510 and corresponding VMs $1535_1$-$1535_N$. Those with ordinary skill in the art will recognize that the various terms, layers, and categorizations used to describe the virtualization components in FIG. 15 may be referred to differently without departing from their functionality or the spirit or scope of the disclosure. For example, the virtual hardware platforms $1540_1$-$1540_N$ may also be considered to be separate from VMMs $1575_1$-$1575_N$, and VMMs $1575_1$-$1575_N$ may be considered to be separate from hypervisor 1510. One example of the hypervisor 16810 that may be used in an example of the disclosure is included as a component in VMware's ESX brand software, which is commercially available from VMware, Inc.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these example, each VM generally includes a guest operating system in which at least one application runs.

For the container examples, it should be noted that these examples applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices. In some examples, the computing system environment includes a first computer system at a first site and/or a second computer system at a second site. The first computer system at the first site in some non-limiting examples executes program code, such as computer readable instructions stored on non-transitory computer readable storage medium.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for automatic deployment of computing instances in a public cloud environment. For example, the elements illustrated in FIG. 1, FIG. 2, FIG. 3, FIG. 4, FIG. 5, and FIG. 6, such as when encoded to perform the operations illustrated in FIG. 10, FIG. 11, FIG. 12, and FIG. 13, constitute exemplary means for performing a first boot of a cloud instance of a host in accordance with a master boot image in a cloud environment, exemplary means for retrieving a cloud host-state configuration from a cloud metadata storage, exemplary means for installing the cloud host-state configuration onto the master boot image to generate a self-configured boot image, and exemplary means for performing a second boot of the cloud instance of the host in accordance with the self-configured boot image to automatically provision the cloud instance with the host-specific configuration data in the cloud environment.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for provisioning of cloud instances in a cloud environment, the system comprising:
   a memory storing data associated with a plurality of customized configurations associated with cloud instances, and computer-executable instruction; and
   at least one processor operationally coupled to the memory and configured to execute the computer-executable instruction to:
   create a stateless boot image;

perform a first boot using the stateless boot image to instantiate a cloud instance on at least one server of a cloud environment;
receive customized configuration data associated with the cloud instance;
install the received customized configuration data onto the stateless boot image to generate a second boot image; and
perform a second boot of the cloud instance using the generated second boot image to provision the cloud instance with the customized configuration in the cloud environment.

2. The system of claim 1, wherein the stateless boot image is immutable.

3. The system of claim 1, wherein the generated second boot image is a self-configured boot image.

4. The system of claim 1, further comprising: on determining that the first boot is complete, modifying a first boot script to prevent the first boot script from executing during the second boot.

5. The system of claim 1, wherein the at least one server is a rule-based deployment server.

6. The system of claim 5, wherein the rule-based deployment server utilizes a set of rules to create a profile for the customized configuration data in the cloud environment.

7. The system of claim 1, wherein the processor is configured to further execute the computer-executable instruction to:
read a pointer indicating a location of the customized configuration data associated with the cloud instance; and
obtain the customized configuration data based on the pointer.

8. A method for provisioning of cloud instances in a cloud environment, the method comprising:
creating a stateless boot image;
performing a first boot using the stateless boot image to instantiate a cloud instance on at least one server of a cloud environment;
receiving configuration data associated with the cloud instance, the configuration data defining a customized configuration;
installing the received configuration data onto the stateless boot image to generate a second boot image; and
performing a second boot of the cloud instance using the generated second boot image to provision the cloud instance with the customized configuration in the cloud environment.

9. The method of claim 8, wherein the stateless boot image is immutable.

10. The method of claim 8, wherein the generated second boot image is a self-configured boot image.

11. The method of claim 8, further comprising: on determining that the first boot is complete, modifying a first boot script to prevent the first boot script from executing during the second boot.

12. The method of claim 8, wherein the cloud environment is a hybrid cloud environment.

13. The method of claim 8, wherein the at least one server is a rule-based deployment server.

14. The method of claim 13, wherein the rule-based deployment server utilizes a set of rules to create a profile for the customized configuration data in the cloud environment.

15. One or more non-transitory computer storage media embodying computer executable instructions that when executed by a processor performs operations comprising:
creating a stateless boot image;
performing a first boot using the stateless boot image to instantiate a cloud instance on at least one server of a cloud environment;
receiving configuration data associated with the cloud instance, the configuration data defining a customized configuration;
installing the received configuration data onto the stateless boot image to generate a second boot image; and
performing a second boot of the cloud instance using the generated second boot image to provision the cloud instance with the customized configuration in the cloud environment.

16. The non-transitory computer storage media of claim 15, wherein the stateless boot image is immutable.

17. The non-transitory computer storage media of claim 15, wherein the generated second boot image is a self-configured boot image.

18. The non-transitory computer storage media of claim 15, with further operations comprising: on determining that the first boot is complete, modifying a first boot script to prevent the first boot script from executing during the second boot.

19. The non-transitory computer storage media of claim 15, wherein the cloud environment is a hybrid cloud environment.

20. The non-transitory computer storage media of claim 15, wherein the at least one server is a rule-based deployment server.

* * * * *